United States Patent
Phan et al.

(10) Patent No.: US 12,443,682 B2
(45) Date of Patent: Oct. 14, 2025

(54) AUTOMATED GENERATION OF OPTIMIZATION MODEL FOR SYSTEM-WIDE PLANT OPTIMIZATION

(71) Applicant: INTERNATIONAL BUSINESS MACHINES CORPORATION, Armonk, NY (US)

(72) Inventors: Dzung Tien Phan, Pleasantville, NY (US); Lam Nguyen, Ossining, NY (US); Pavankumar Murali, Ardsley, NY (US); Nianjun Zhou, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 16/938,884

(22) Filed: Jul. 24, 2020

(65) Prior Publication Data

US 2022/0027685 A1     Jan. 27, 2022

(51) Int. Cl.
*G06F 18/20*   (2023.01)
*G06F 17/16*   (2006.01)
*G06F 18/21*   (2023.01)
*G06N 7/01*    (2023.01)
*G06N 20/00*   (2019.01)

(52) U.S. Cl.
CPC ............ *G06F 18/29* (2023.01); *G06F 17/16* (2013.01); *G06F 18/217* (2023.01); *G06N 7/01* (2023.01); *G06N 20/00* (2019.01)

(58) Field of Classification Search
USPC .......................................................... 706/12
See application file for complete search history.

(56) References Cited

U.S. PATENT DOCUMENTS

| | | | |
|---|---|---|---|
| 5,838,881 A | * | 11/1998 | Nelson ............... G05B 13/0285 706/2 |
| 7,464,009 B2 | | 12/2008 | Schwarzmann |
| 9,905,224 B2 | | 2/2018 | Nissan |
| 10,241,961 B2 | | 3/2019 | Weyerhaeuser et al. |

(Continued)

FOREIGN PATENT DOCUMENTS

| | | |
|---|---|---|
| AU | 2021312278 A1 | 2/2023 |
| CN | 103399868 A | 11/2013 |

(Continued)

OTHER PUBLICATIONS

Tiwang, R. et al., "A Deep Learning Model for Source Code Generation"; IEEE (2019); 7 pfa.

(Continued)

*Primary Examiner* — Tsu-Chang Lee
(74) *Attorney, Agent, or Firm* — CHIP LAW GROUP

(57) ABSTRACT

A computer implemented method for automatically generating an optimization model for site-wide plant optimization includes mapping a process flow diagram of a plant process to a graph comprising nodes and edges, wherein the nodes represent processes and the edges represent flows between processes. A behavior is learned for each node of the graph based at least on historic data of the plant process. One or more regression functions are modeled for each node to predict an output of each of the processes, wherein the one or more regression functions are modeled based on the learned behavior for each node.

22 Claims, 12 Drawing Sheets

(56) References Cited

U.S. PATENT DOCUMENTS

| | | | |
|---|---|---|---|
| 2008/0167852 A1* | 7/2008 | Bartee | G05B 13/048 |
| | | | 703/11 |
| 2011/0119037 A1 | 5/2011 | Rashid et al. | |
| 2013/0166338 A1* | 6/2013 | Philipp | G06Q 10/06 |
| | | | 705/7.13 |
| 2014/0125333 A1* | 5/2014 | Hanada | G01R 33/56572 |
| | | | 324/318 |
| 2015/0149247 A1* | 5/2015 | Kramskaia | G06Q 30/0201 |
| | | | 705/7.31 |
| 2018/0373986 A1* | 12/2018 | Rainwater | G06F 11/36 |
| 2019/0205762 A1 | 7/2019 | Sher et al. | |
| 2019/0286659 A1 | 9/2019 | Leskovec et al. | |
| 2020/0167647 A1* | 5/2020 | De Waele | G06F 17/18 |
| 2020/0201293 A1* | 6/2020 | Hou | G06N 5/022 |
| 2021/0026314 A1* | 1/2021 | Phan | G05B 13/0265 |

FOREIGN PATENT DOCUMENTS

| | | |
|---|---|---|
| CN | 104239137 A | 12/2014 |
| CN | 108376315 A | 8/2018 |
| CN | 110569584 A | 12/2019 |
| CN | 111353002 A | 6/2020 |
| CN | 116157812 A | 5/2023 |
| KR | 10-2023-0029763 A | 3/2023 |
| WO | 2022/018552 A1 | 1/2022 |

OTHER PUBLICATIONS

National Research Council 1991. Research Directions in Computational Mechanics. Washington, DC: The National Academies Press. https://doi.org/10.17226/1909; 16 pgs.

Jiang, W. et al., "Optimal Functional-Unit Assignment for Heterogeneous Systems Under Timing Constraint"; IEEE (2017); vol. 28:9; pp. 2567-2580.

International Search Report and Written Opinion issued Sep. 28, 2021 in related application PCT/IB/2021/056068; 7 pgs.

Intellectual Property Office, "Request for the Submission of an Opinion," Aug. 22, 2025, 12 Pages, KR Application No. 10-2023-7000315.

* cited by examiner

AUTOMATED GENERATION OF OPTIMIZATION MODEL FOR SYSTEM-WIDE PLANT OPTIMIZATION

BACKGROUND

Technical Field

The present disclosure generally relates to plant optimization computer systems and methods and software for use therewith, and more particularly, to methods and systems for the automated generation of an optimization model for system-wide plant optimization to generate operational setpoint recommendations for a process plant.

Description of the Related Art

Manufacturing and process industries comprise a site-wide network of complex processes, each with a self-contained set of inputs and outputs. Within a unit process, there often exists a transient relationship between set-points, throughput, and quality of the desired output, and the resulting flow of waste. The variability in input flows, operational requirements, maintenance, breakdowns, changes in production plans, and the like makes the production process dynamic. Plant-wide management requires the ability to predict the dynamic process behavior and to alter any controls to adhere as closely as possible to the production plan. Manual optimization model generation is time-consuming, challenging and requires both domain experts and optimization experts.

Current industry practices include very limited use of Artificial Intelligence (AI) to devise an operational strategy. For instance, in the event of an unplanned process breakdown, a plant manager or a plant manager (PM) might use an experience-based or a heuristic-based approach to determine set points that offer the best production rates under the operational constraints levied by the breakdown.

A common feature in conventional processes is the use of nonlinear physical first principles (e.g., thermodynamics) models for each process, coupled via flow and material balance equations. Existing work has previously combined physical models and data-driven models. The development of surrogate statistical models for complex processes has been undertaken, but mainly as an experimental design to estimate a response surface model using a detailed process simulator. Some conventional processes have used surrogate models to optimize production processes, but this is usually done at the design phase to optimize a flowsheet structure or in the context of optimizing set points for a single process. The conventional processes are not able to rely only on historical plant sensor data without the use of a plant simulator.

A conventional end-to-end learning method considers only a single process and can handle only specific classes of problems due to solving a two-stage stochastic programming problem. Typical processes assume that the optimization problem is convex with respect to control variables. The condition does not hold for many common regression functions such as decision tree regression, deep neural networks, multivariate adaptive regression splines (MARS), and random forests. Some conventional end-to-end learning methods require that decision-focused learning framework be represented as a linear program or submodular maximization. Since the sensor data for plants come from different temporal resolutions, it is unlikely to build an end-to-end solution for a site-wide optimization problem.

The present disclosure presents a framework to automatically generate optimization models for the multi-period set point control problem in multi-plant process industries.

SUMMARY

According to various embodiments, a computer implemented method is provided for the automated generation of an optimization model for site-wide plant optimization. The method includes mapping a process flow diagram of a plant process to a graph comprising nodes and edges, wherein the nodes represent processes and the edges represent flows between processes. A behavior is learned for each node of the graph based at least on historic data of the plant process. One or more regression functions are modeled for each node to predict an output of each of the processes, wherein the one or more regression functions are modeled based on the learned behavior for each node.

In some embodiments, the graph is a directed acyclic graph of a plant.

In some embodiments, inputs for each node include controlled variables and uncontrolled variables.

In some embodiments, the method further includes encoding network topology by generating an adjacency matrix for the graph, the adjacency matrix identifying interconnected nodes.

In some embodiments, the method further includes decoding the network topology using one or more matrices and positions of nodes and edges from the graph to plot a directed acyclic graph for input verification.

In some embodiments, the method further includes generating an optimization model from the regression functions for each node and the adjacency matrix, the optimization model providing setpoints for each node for an optimization of one or more parameters.

In some embodiments, the optimization model outputs a continuous optimization model with a function value estimator and a gradient estimator. In some embodiments, the optimization model outputs a mixed-integer linear program for modelling the one or more regression functions.

In some embodiments, the method further includes providing different key performance indicators as input and producing options for setpoints to achieve the inputted key performance indicators.

In some embodiments, the method further includes automatically determining whether an input of the regression function is correct.

In some embodiments, the graph is a two-level fully connected feed-forward network.

In some embodiments, the regression functions include piece-wise linear and non-linear types of regression models.

According to various embodiments, a computer implemented method and a non-transitory computer readable storage medium tangibly embodying a computer readable program code having computer readable instructions that, when executed, causes a computer device to carry out a method of improving computing efficiency of a computing device for automatically generating an optimization model for site-wide plant optimization, the method includes defining a graphical representation comprising nodes and edges for a process flow diagram of the plant processes, wherein the nodes of the graphical representation represent processes and the edges of the graphical representation represent flows between the plant processes. A network topology is encoded of the graphical representation by generating an adjacency matrix for the graph, the adjacency matrix identifying interconnected nodes. A set of equations defining the network topology is automatically generated. One or more regression functions are modeled using a machine learning platform to predict an output of each process of the plant processes based on inputs received at each process. An optimization model is generated from the one or more regression functions for each node and the adjacency matrix, the optimization model providing setpoints for each process of the plant.

There is a significant opportunity to build advisory support for PMs to enable the exploration and evaluation of a larger set of options to compute optimal policies for sequential decisions at a plant-wide scale. First, in order to build such an AI-based advisor, a system is trained to have an expert level understanding of behavioral relationships between inputs and outputs. Second, this behavioral representation is used, along with other operational constraints, to determine optimal set-points for all control variables. Aspects of the present disclosure provide solutions for these opportunities.

By virtue of the concepts discussed herein, a tool is provided that improves upon methods for generating optimization models for site-wide plant optimization. As shown in the examples below, the optimization models according to aspects of the present disclosure can provide optimal objective values with an average computing time significantly shorter than conventional regression methods.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Figure 1:
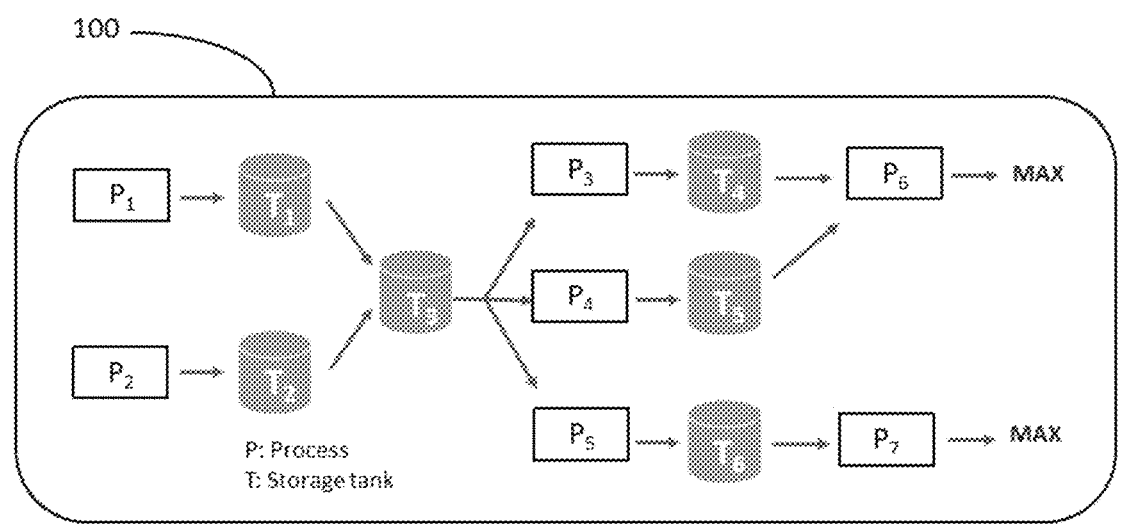
FIG. 1 is schematic representation of a time-indexed graphical representation of a network of multiple plants for optimization with the optimization model consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

As discussed in greater detail below, the present disclosure generally relates to systems and computerized methods for the automated generation of an optimization model for site-wide plant optimization. The systems and computerized methods provide a technical improvement in the efficiency and accuracy of computer systems by utilizing data-driven machine learning and optimization techniques to improve plant production under various asset capacity constraints and different production strategies.

As used herein, the term "site-wide optimization" refers the following with reference to a product production plant, such as an oil sands processing plant. Given the current state of all process variables and storage inventories, along with known restrictions on available capacities over a planning horizon, site-wide optimization seeks to compute an optimal production plan over time that maximizes the flow throughput of end products. Usually, this is expressed in terms of optimal flow rates and inventories of various quantities over time, and we seek to do so in the presence of various operational and economic considerations like the smoothness of the production plan, maintaining acceptable inventories in each time-period, and meeting economic production or demand targets.

In process industries, a planning department develops a production plan for the planning horizon, based on market forecasts, demand forecasts, maintenance and resource schedules, operating conditions, field logistics, and the like. To account for inherent uncertainty in daily operations, the production plan is revised either daily or every shift. PMs focus on ensuring that the key performance indicators (KPIs), such as throughput, adhere to the production plan as much as possible. They work with process engineers to handle coordination of production levels and targets across several processes. In the event of unexpected disruptions, PMs are responsible for minimizing recovery time to normalcy and the deviation from a production plan. Under normal operations, a production plan helps identify abnormal deviations which drive course corrections. PMs, however, are unable to manually provide optimization parameters for an entire plant. Typically, PMs are assigned to a single process, having its own KPI which may or may not align with an PM at a downstream process at the plant.

A typical process flow diagram could be used for site-wide process optimization. Set points, such as temperatures, pressures, flow rates, and the like, are used to control the behavior of processes and plants. Invariably, set points have both upstream and downstream effects. Hence, in a processing plant with thousands of controllable set points it is likely that a single critical set point may affect the overall throughput or yield, and how far they are from a baseline production plan.

Figure 2:
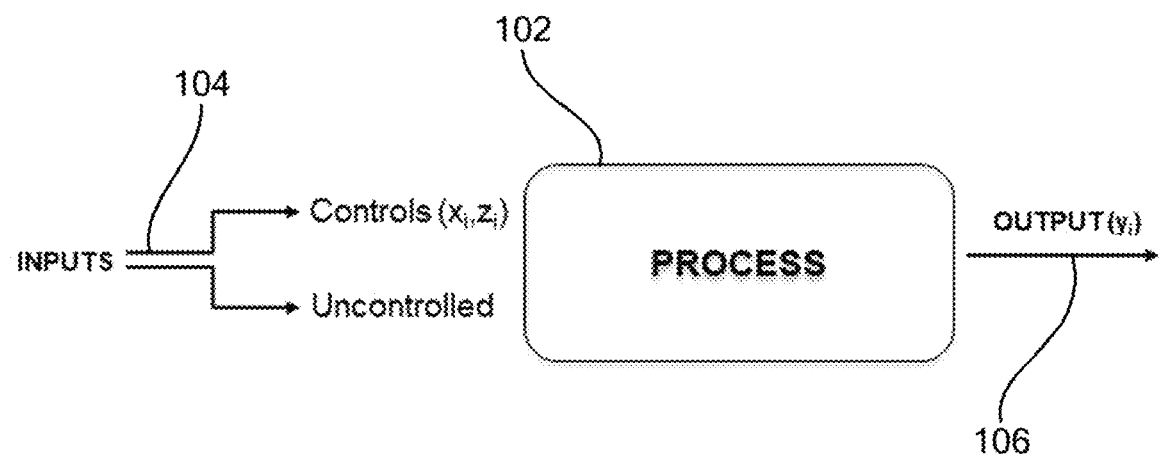
FIG. 2 is a flow diagram illustrating an estimation used for each process via a regression function, consistent with an illustrative embodiment.

Referring to FIGS. 1 and 2, one act in developing a sitewide optimization model is to create a time-indexed graphical representation 100 (also referred to as directed acyclic graph 100) of the various processes, P1, P2, P3, P4, P5, referred generically as process 102. In a typical time-indexed graphical representation 100, each process 102 has a self-contained set of inputs 104 and outputs 106, where an output from an upstream process becomes an input into a downstream process. In the example of FIG. 1, storage tanks T1, T2, T3, T4 may be used to identify an output from one process and an input to another process. For example, the output from process P1 is in tank T1 and the output from process P2 is in tank T2. Tank T3 is the combination of tank T1 and tank T2 and provides the input to process P3.

Each node in the graph 100 represents the state of a specific process (e.g., P1) or a storage tank (e.g., T1), and each edge denotes a corresponding material flow rate. More generally, each plant itself could be modeled using multiple lower level process nodes that connect to make up the plant. It is useful to adopt a discrete time model, i.e., a set of time periods at a chosen resolution, say hourly intervals. The plant variables could be defined to be in correspondence with either time periods (e.g., flow rates, set points over the next hour), or with time points, i.e., the endpoints of any time period (e.g., tank levels at the end of the next hour). Each node or edge is also equipped with a data structure to capture various parameters like current set points, states of other process variables in the plant (e.g., quality, temperature, density), static capacity limits, flow throughput limits, and the like. While the above network representation is necessarily a simplification of a realistic process flow diagram, it can be used for realizing a prediction optimization framework.

The inputs 104 may include controlled variable, such as voltage, temperature, or the like, and uncontrolled setpoints, such as feed flow, for example. Observations may be made for each process 102, where the observations can include sensor readings during a particular process. For each process 102, a prediction of the output 106 may be made based on a regression function, as discussed in greater detail below. Historic data for each process 102, based on actual values of the inputs 104 and the output 106, may be used to provide data for the optimization model to make such predictions. Therefore, a further act is a process according to the present disclosure is to learn the behavior for each process. While historic data may be used initially, during plant operation, real-time data may be used to update the machine learning, adjusting the output predictions as required based on this data.

Figure 3:
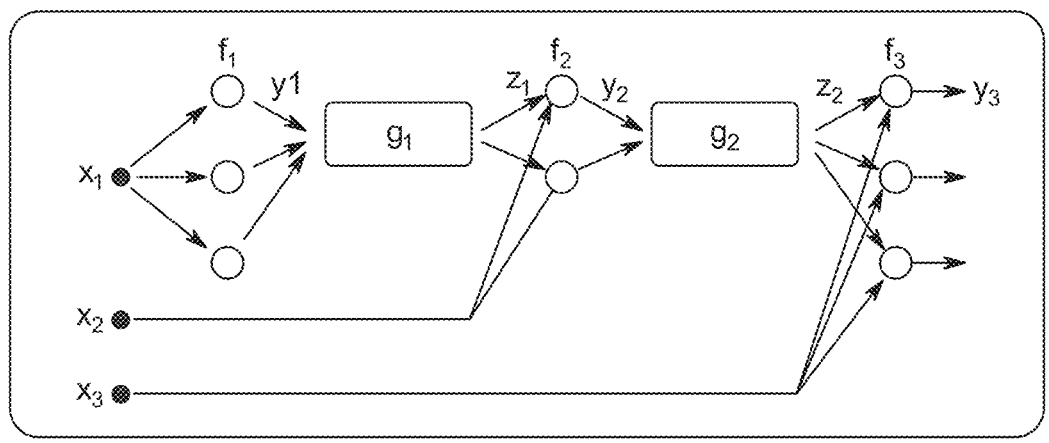
FIG. 3 is a flow diagram illustrating a generalized network representation with the application of a regression function, consistent with an illustrative embodiment.

A further act in the process for site-wide optimization is to solve the optimization problem. FIG. 3 provides an overview of the operation of the optimization model of the present disclosure in solving the optimization problem. In FIG. 3, x represents the control variable input and f represents a predictive model applied to X to provide output y. The variable z represents the uncontrolled variables, such as flow. Therefore, reading FIG. 3 from left to right, for a given process, given a first set of controlled variables $x_1$, predictive model $f_1$ may predict the output $y_1$. This product, stored in $g_1$ may be supplied as the input for a second process, where $z_1$ represents the flow from $g_1$, $x_2$ represents the controlled variables, and $f_2$ is a predictive model for predicting output $y_2$. Similarly, $y_2$ provides, via $g_2$, input for a further downstream process, where $z_2$ are the uncontrolled variables, such as flow from $g_2$, $x_3$ are the controlled variables and predictive model $f_2$ can determine outputs $y_3$. The optimization model of the present invention can, given measurements from sensors along the various processes, determine optimal values of the controlled variables $x_1$, $x_2$, $x_3$ in order to optimize the desired output, which may be output flow, product purity, or the like.

Figure 4A:
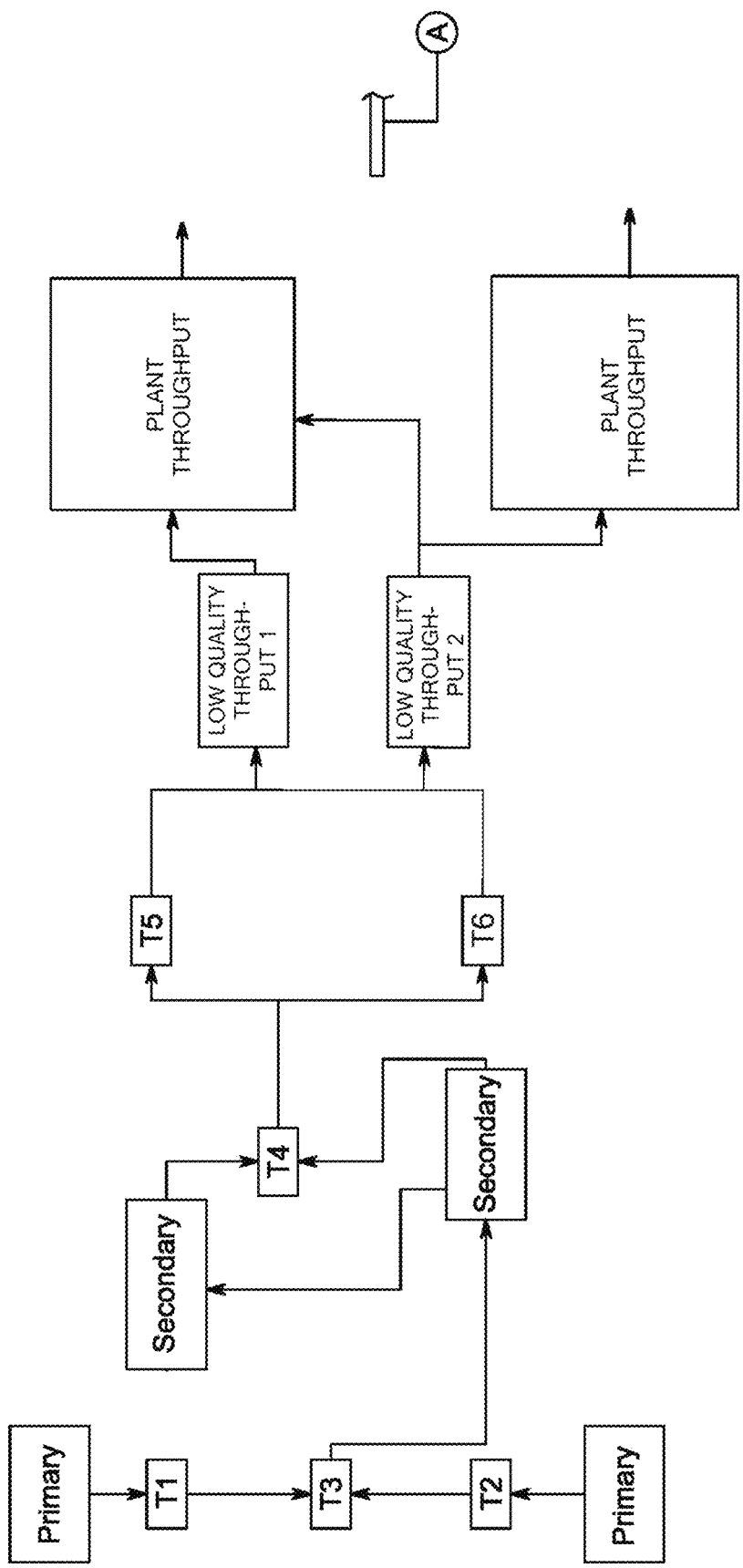
FIGS. 4A and 4B illustrate the use of a model generator for generating an optimization model with minimal inputs and optimization background, consistent with an illustrative embodiment.
Figure 4B:
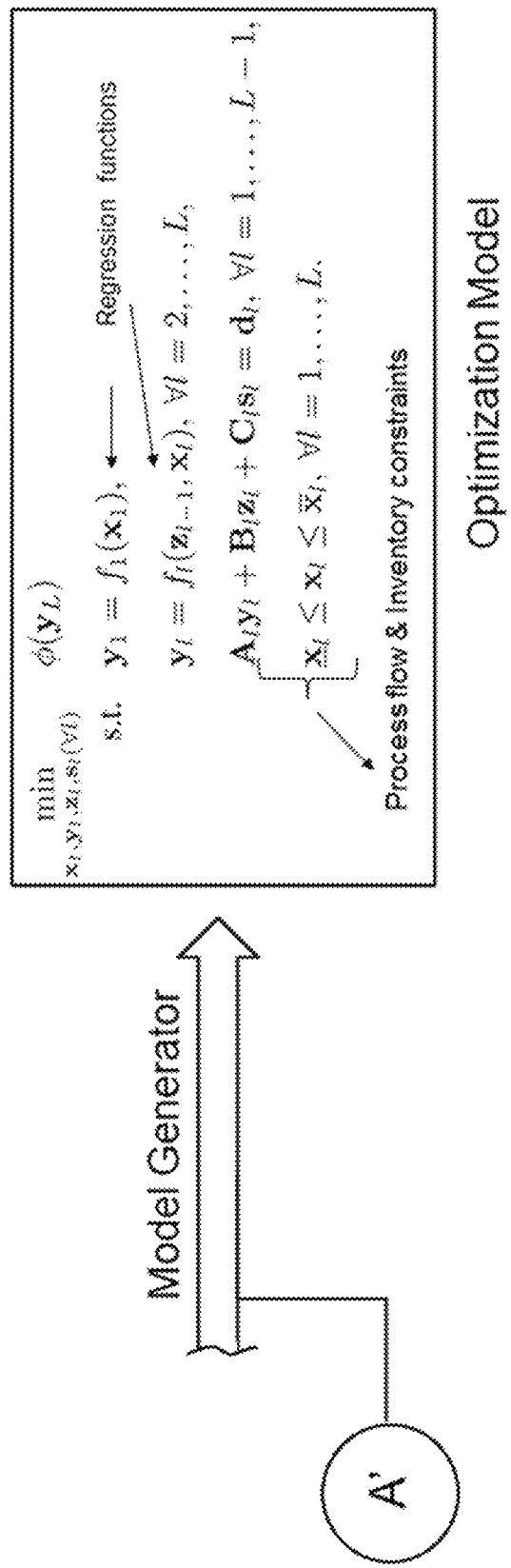

FIGS. 4A and 4B illustrate an exemplary process flow diagram. Aspects of the present invention, as discussed in greater detail below, is to simplify the process of model generation from the process flow diagram into a model that can be used as an optimization model where the number of inputs can be minimized. As discussed above, manual optimization model generation is often challenging and requires both domain experts and optimization experts. Further, manual optimization models can only focus on each process without the ability to perform site-wide optimization model generation, as such requires consideration of not only hundreds or thousands of setpoints, but also the flows between each of the processes that changes as a result of changes to such setpoints.

Figure 5:
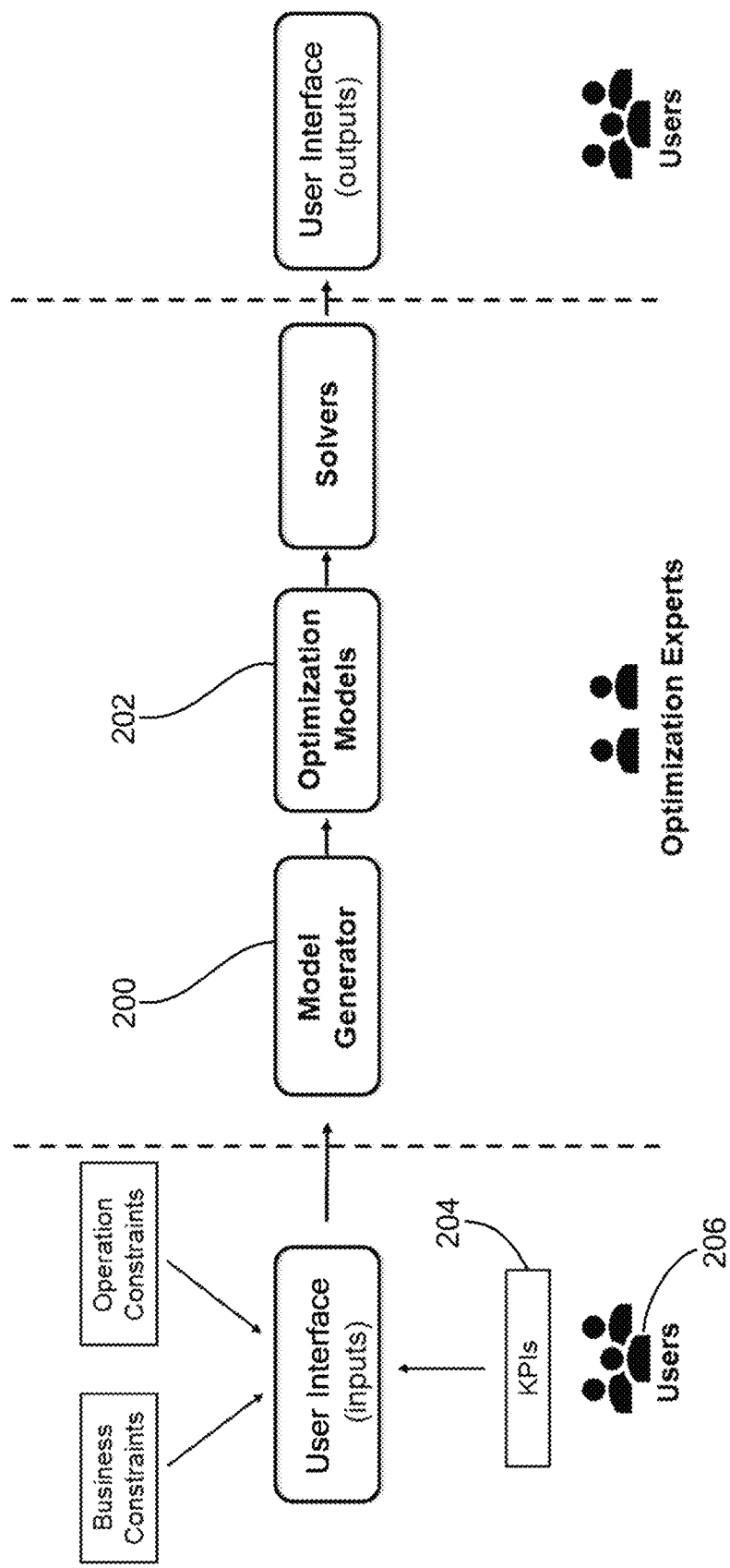
FIG. 5 is a schematic representation of an end-to-end system for an optimization solution, consistent with an illustrative embodiment.

FIG. 5 illustrates an end-to-end system for an optimization solution. Aspects of the present disclosure focus on model generation 200, based on input from programmers 206 with domain understanding, and development of an optimization model 202, based on the KPIs 204 identified by the plant. For example, the optimization model 202 may be developed based on the KPI 204 that is to maximize product output.

Figure 6:
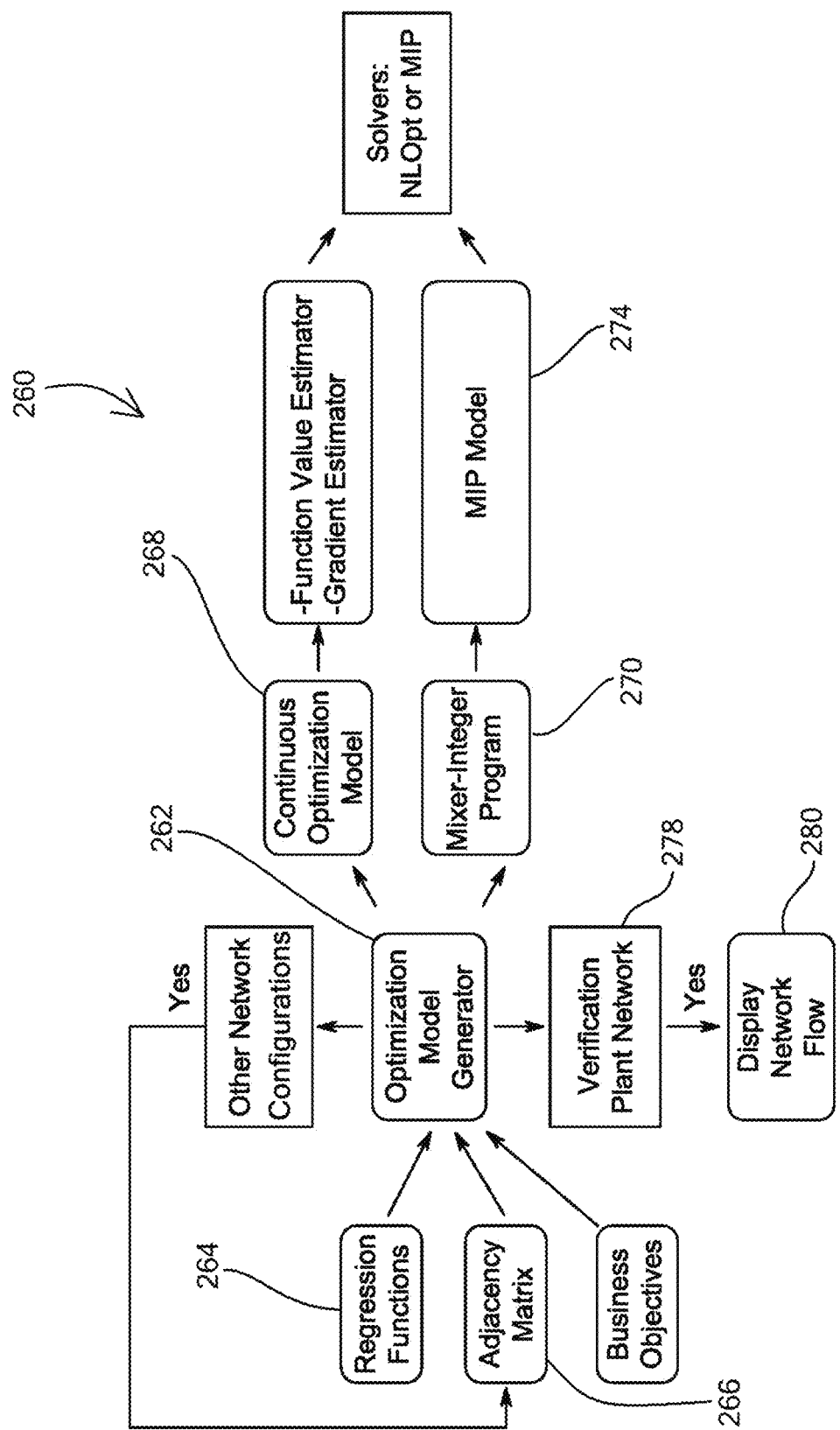
FIG. 6 is a flow diagram showing an automated model generation system, consistent with an illustrative embodiment.

Referring now to FIG. 6, a diagram is shown representing an automated optimization model generation system 260. Broadly, aspects of the present disclosure provide a method for the automated generation of optimization models 262 for site-wide optimization. The optimization models 262 can be obtained from regression functions 264 for each node (such as process P1, see FIG. 1), including control, observed and environmental variables and from an adjacency matrix 266 for the directed acyclic graph 100 (see FIG. 1) for the entire plant. The outputs of the optimization model can include a continuous optimization model 208, that can provide function values, gradients and the like, and a mixed-integer linear program 270 that provides a mixed-integer program (MIP) model 274. A user may experiment with different configurations and KPIs to product a list of options for setpoints and expected target values, where the best one may be selected by the user. A Verification plant network 278 may be provided to validating the correctness of the inputs and to display the network flow 280.

The above general description of aspects of the present disclosure are expressed in greater detail below, referring to FIGS. 7A through 11.

As discussed above, one act of the present disclosure is to define a graphical representation for the process flow diagram of a particular plant. A two-level fully connected feed-forward network (FFN) may be used as described in greater detail below.

Figure 7A:
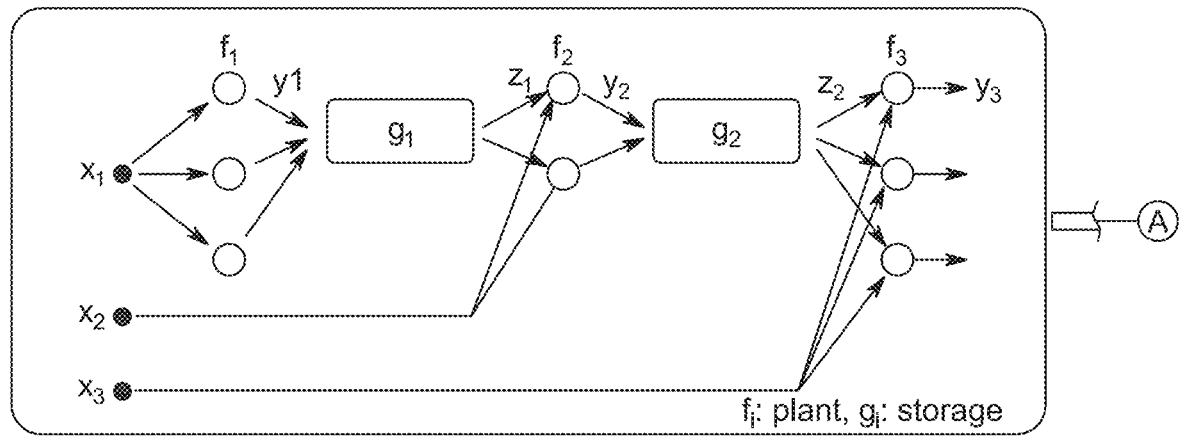
FIGS. 7A and 7B illustrate modeling a process flow plant as a two-level fully connected feed-forward network with no skip layer assumption, consistent with an illustrative embodiment.
Figure 7B:
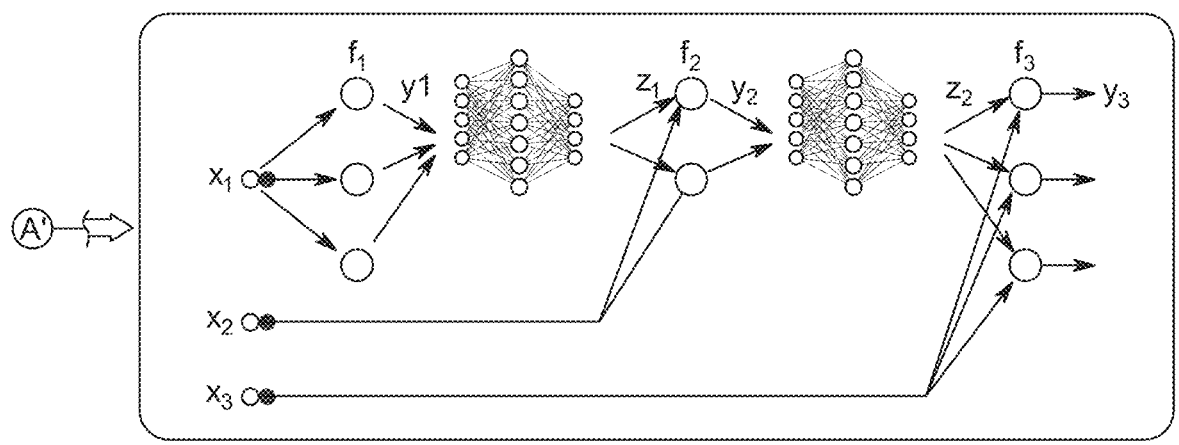

Referring specifically to FIGS. 4B, 7A and 7B, a representation of the process flow is described as a directed graph with input, control and output variables as arcs and each unit operation denoted by a node. Each node could represent a unit process or a system of unit processes that is modeled together. The canonical form for the single-period optimization problem is shown in FIG. 4B, where, where $f_l$ is the collection of regression functions at the l-th process layer and the linear constraint $g_l(y_l, z_l, s_l)=A_l y_l+B_l z_l+C_l s_l-d_l=0$ captures the network flow constraints that represent mass balance and inventory level.

The objective function is defined in terms of some KPIs (e.g., throughput) and the formulation is treated as a maximization or minimization problem. Within this formulation, each node is represented by a prediction model that is expressed as a set of constraints as shown above. For deployment purposes, the system can solve a multi-period model for a long-term planning horizon.

The present disclosure considers the problem for optimizing control variables over T time periods with some coupling constraints between periods. The multi-period optimization problem can be written as follows:

$$\min_{x^t,u_l^t} \sum_{t=1}^{T} \phi^t(y_L^t)$$

such that:

$x^t \in X^t$, $|x_l^t - x_l^{t+1}| \leq \rho_l \odot x_l^t$ $\underline{u}_l \leq u_l^t \leq \overline{u}_l$ $u_l^t = u_l^{t-1} + y_l^t - z_l^t$ $|u_l^t - u_l^{t-1}| \leq \alpha_l \odot u_l^{t-1}$ $(l=1, \ldots, L, t=1, \ldots, T)$, for some $\rho_l \in [0,1]$, $\alpha_l \in [0,1]$, where, $\underline{u}_l$ and $\overline{u}_l$ are tank storage limits and $X^t$ is the set of constraints for the t-th period having a form in FIG. 4B. Let $\odot$ denote the component-wise product. One uses the time index $t \in \{1, \ldots, T\}$ for the t-th period model.

The optimization approach has the ability to efficiently solve for various types of regression models. For regression models, such as linear regression and decision tree, the optimization approach can reformulate the problem as a scalable mixed-integer linear program (MILP). Relaxation methods such as McCormick envelope and Sherali-Adams' reformulation linearization technique can be used to handle specific bi-linear forms from pooling constraints. Nonlinear regression functions such as general deep neural networks or general ensemble models can lead to nonlinear constraints or even black-box constraints. In addition, depending on the type of the learned prediction model, nonlinear optimization algorithms can be used to exploit the special structure of problems. For instance, for a single period model, such as shown in FIG. 4B, an augmented Lagrangian method (ALM) can be used to solve for it when $f_l$ is highly non-linear, it cannot be linearized and its gradients are available. The other set of linear constraints in FIG. 4B capture the process flow (i.e., network flow constraints) that represent mass balance and inventory levels.

Transforming real-word problems into mathematical models that can be solved efficiently often involves significant time and optimization skills. In order to efficiently provide an optimization model solution to scale well to many use cases and scenarios, aspects of the present disclosure create and deploy optimization models that could not otherwise be developed by domain and optimization experts. Often times, once deployed, updating models, for example adding new constraints, can once again require significant time and skills. However, aspects of the present disclosure provide a framework to take input, requiring minimal knowledge from domain subject matter experts and optimization experts, to automatically generate optimization models.

Figure 8:
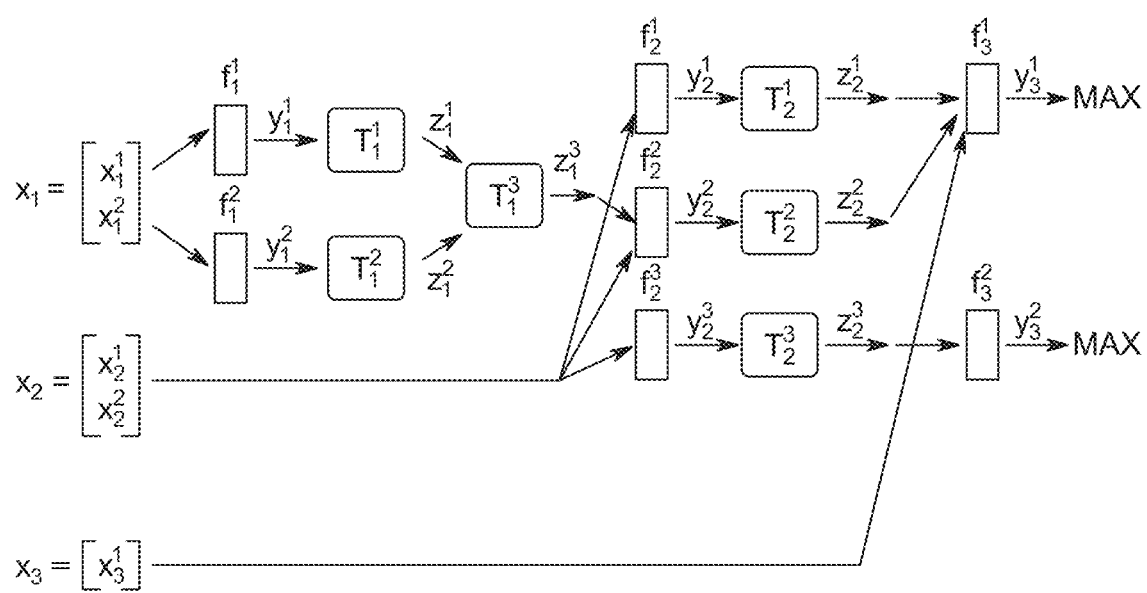
FIG. 8 illustrates the preparation of an adjacency matrix for directed acyclic graph generation for an entire system, consistent with an illustrative embodiment.

The solution can use a two-level feed-forward network (FFN) as a graphical representation for the process flow diagram, as shown in FIG. 7B. The feed-forward network structure is used to model each storage tank sub-system between two process layers, which results in a two-level network as in FIG. 7B for the entire system. A user can prepare the adjacency matrix for the DAG 100 (see FIG. 1) by following rules: 1) column-wise traversal for indexing, from left to right, 2) labeling the i-th process by Pi, the i-th tank by Ti, and 3) creating a connection matrix A for the two-level feed-forward network. FIG. 8 provides an example of a process flow diagram that can result in a connection matrix. An exemplary connection matrix/adjacency matrix is shown below:

|    | P1 | P2 | T1 | T2 | T3 |
|----|----|----|----|----|----|
| P1 | 1  | 0  | 1  | 0  | 0  |
| P2 | 0  | 1  | 0  | 1  | 0  |
| T1 | 1  | 0  | 1  | 0  | 1  |
| T2 | 0  | 1  | 0  | 1  | 1  |
| T3 | 0  | 0  | 1  | 1  | 1  |

Figure 9:
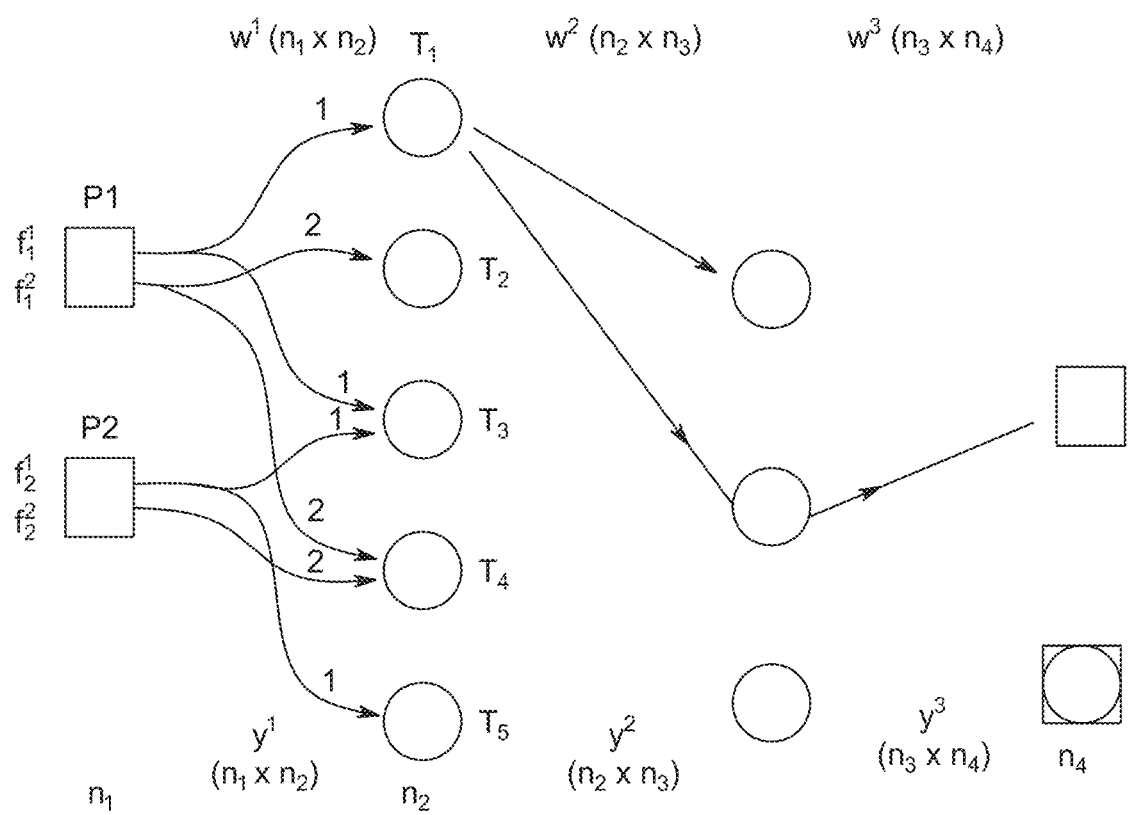
FIG. 9 illustrates the preparation of the adjacency matrix for directed acrylic graph generation when there is more than one product for a plant, consistent with an illustrative embodiment.

For a process producing with more than one product, the entry in the connection may be not only zero or one but could be two or three or more. For example, as shown in FIG. 9, if a process can produce two products, the connection matrix can include a 2. In FIG. 9, for P1, there are two products, thus the connection matrix can be (P1, T1)=1, (P1, T2)=2, (P1, T3)=1 and (P1, T4)=2. By following these rules, we note that there is a unique connection matrix representation for any two-level feed-forward network and vice versa.

Figure 10:
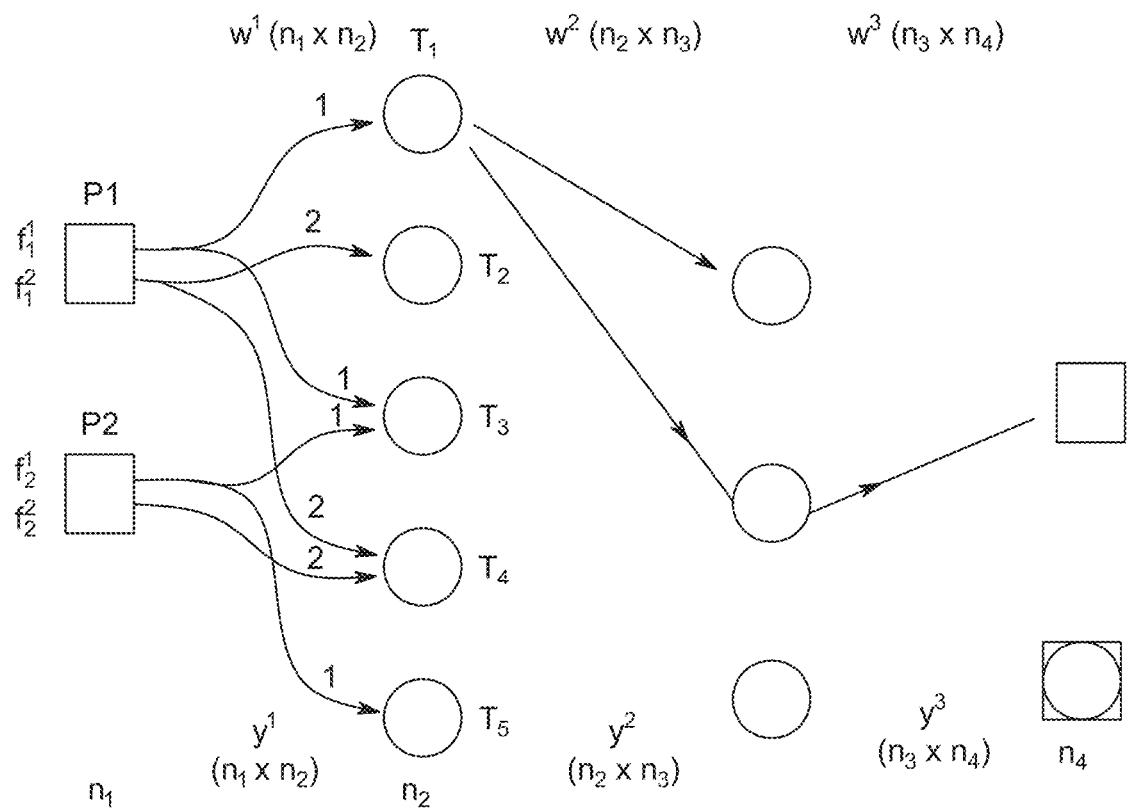
FIG. 10 illustrates decoding network topology for input verification, consistent with an illustrative embodiment.

For decoding network topology, referring to FIG. 10, given the connection matrix A, detailed information for the two-level network such as layer structure and position for each process and tank can be reconstructed. Let [label= $P_1, \ldots, P_{V1}, T_1, \ldots, T_{M1}, P_{V1+1}, \ldots, P_{V1+V2}, \ldots, T_{M1}+ \ldots +M_{L-2}+1, \ldots, T_{M1}+ \ldots +M_{L-1}, \ldots, P_{V1}+ \ldots +V_{L-1}+1, \ldots, P_{V1+ \ldots +V_L}]$ be the column and row labels of A. The linear constraints of type $A_l y_l + B_l z_l + C_l s_l = d_l$ can be generated, where $V_l$ is the number of processes in the l-th process layer, $M_l$ is the number of tanks in the l-th process layer, $S_l$ is the number of tank layers between process layers l and l+1, $K_l^s$ is the number of tanks at the s-th tank layer, locating between l-th and (l+1)-th process layers, $W_l^s$ is the connection matrix for the s-th and (s+1)-th tank layers of the tank subsystem between l-th and (l+1)-th process layers, and $v_{l,s}^t$ are flows between s-th and (s+1)-th tank layers, locating between l-th and (l+1)-th process layers.

Flow balance constraints at tanks can be determined by the formula—

$$u_{l,s}^t(i) = u_{l,s}^{t-1}(i) + \sum_{m=1}^{K_l^{s-1}} \text{sign}(W_l^s(m,i)) \cdot v_{l,s}^t(m,i) - \sum_{k=1}^{K_l^{s+1}} \text{sign}(W_l^{s+1}(i,k)) \cdot v_{l,s+1}^t(i,k), \quad (1)$$

$$i = 1, \ldots, K_l^s, l = 1, \ldots, L; s = 1, \ldots, S_l$$

where $s_l = (u_l, v_l)$.

Flow balance constraints at plants, by linking to the output of regression functions: $l=2, \ldots, L; p=1, \ldots, V_s$ by the formula—

$$y_{l,p}^t(i) = \sum_{j: W_l^s(p,j)=i} \text{sign}(W_l^s(p,j)) \cdot v_{l,s}^t(p,j), \forall i \quad (2)$$

where i is the ordinal position of the product in the p-th process at the s-th process layer.

Linking to the input of regression functions: $l=2, \ldots, L; p=1, \ldots, V_s$ $$z_{l,p}^t = \text{zerotrim}(\text{sign}(W_{l,S_l+1}^t(:,p)) \odot v_{l,S_l+1}^t(:,p)), \quad (3)$$

where zerotrim(v) is to trim all 0-s elements in vector $v \Sigma \mathbb{R}^n$.

Regression constraints can be defined by the following formulas:

$$y_{1,p}^t = f_{1,p}(x_{1,p}^{(t)}), p=1, \ldots, V_1$$

$$y_{l,p}^t = f_{l,p}(z_{l-1,p}^t, x_{l,p}^t), l=2, \ldots, L; p=1, \ldots, V_s \quad (4).$$

An exemplary decoding algorithm is illustrated below.

---

Algorithm 1 Decoding Algorithm

Step 1. Break matrix A into matrices $A_l$, $l = 1, \ldots L - 1$, where $A_l$ is a sub-matrix of A with label label$_l =$
$[P_{v_1+\ldots+v_{l-1}+1}, \ldots, P_{v_1+\ldots+v_l}, T_{M_1+\ldots+M_{l-1}+1}, \ldots, T_{M_1+\ldots+M_l}, P_{v_1+\ldots+v_{l+1}}, \ldots, P_{v_1+\ldots+v_{l+1}}]$
Step 2. Analyze $A_l$, $l = 1, \ldots, L - 1$ to get the information of the sub-layers of the tanks at layer l.
Note that $A_l$ contains $V_l + M_l + V_{l+1}$ rows and $V_l + M_l + V_{l+1}$ columns
  1. Create a hash table dict with key = 0 (s = 0) with the set $\{1, \ldots, V_l\}$
  with the position of the first $V_l$ with label 'P', that is, dict[0] = $\{1, \ldots, V_l\}$
  2. Get the information of the sub-layers of the tanks.
    Set s = 1 and set stop-flag = 0.
    While stop-flag = 0 do
      Create dict[s] as an empty set.
      For j in dict[s − 1] do
        Get the positions of non-zero element in row Ad[j] and
        add to the set dict[is]
      End For
      If dict[s] is an empty set (there is no (right) connections)
        Set stop-flag = 1.
      End If
      Set s ← s + 1
    End While
  3. Create sub-matrices of the connections
    For s in (length of dict) − 1 do
      $W_j$ = Al[row, column]
      where rour from lowest index in dict[s] to highest index in dict[s]; and
        column: from lowest index in dict[s + 1] to highest index in dict[s + 1]
    End For
Output: $W_j$, s = 1, \ldots, Sl + 1 and l = 1, \ldots, L − 1

---

Figure 11:
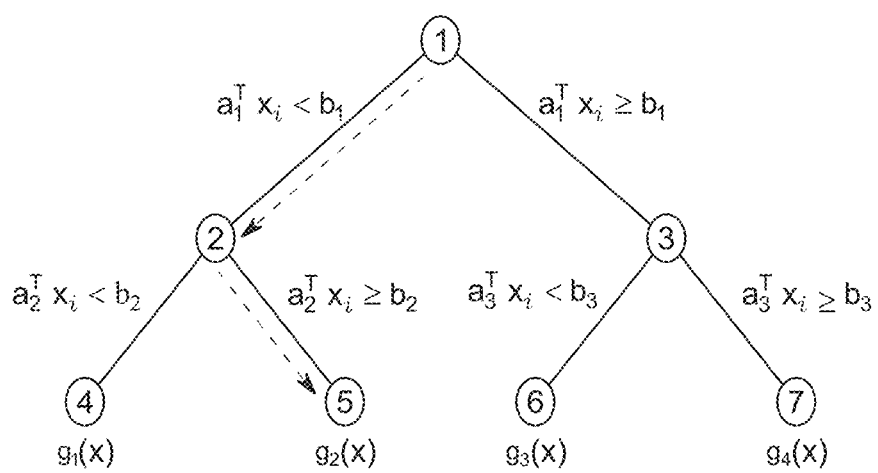
FIG. 11 illustrates a continuous model for regression functions, consistent with an illustrative embodiment.

Referring to FIG. 11, a continuous model for regression functions is shown. For piece-wise linear partition models, such as decision tree (DT), multivariate adaptive regression splines (MARS), and FFN, one can trace to the leaf node and compute the gradient. The function value can be computed from the regression function.

Optimization Algorithms

Aspects of the present disclosure provide three approaches for three different types of regression functions: piece-wise linear regressors, gradient-based regressors, and black-box regressors.

Mixed-Integer Formulation for Piece-Wise Linear Regressors

For partition regressions based on piece-wise linear approach, including linear regression and decision tree, one can formulate the regression function as a mixed-integer linear program. The main idea is to use an exact mixed-integer linear representation for each regression function $f_l$.

A decision tree regression $y=h_l(x)$ comprises leaf nodes and branching nodes. Denote L by the set of leaf nodes, B by the set of branching nodes. For each leaf node $L \in B$, aa linear model of the form $r(x)=w_l^T x+c_l$ has been learned from the training data based on the points assigned to the leaf node. A branching node $l \in B$ is represented by a hyperplane $a_l^T x+b_l$, where if $a_l^T x+b_l<0$ then the point x will follow the left branch from the node, otherwise it splits into the right branch. Since the topology of the tree is fixed, for each feature vector x, there is a unique path leading to a leaf node $l \in B$ from the root of the tree. Let $N_L(l)$ denote the ancestor nodes of l where the left branch is followed on the path from the root to l, and let $N_R(l)$ denote the set of right branch ancestors on the path. The binary variable $e_l \in \{0,1\}$, $l \in L$ indicates if x is assigned to leaf node l then $e_l=1$.

Exactly one leaf node is selected for a data point x $$\sum_{\ell \in \mathcal{L}} e_\ell = 1. \quad (6)$$

To determine the unique path routing to a leaf node, with the help of the indicator variable $e_l$, the following constraints are enforced for modeling the splitting at branching nodes $$a_k^T x + b_k < M_1(1-e_l), \forall l \in \mathcal{L}, k \in \mathcal{N}_L(\ell)$$

$$a_k^T x + b_k \geq -M_2(1-e_l), \forall l \in \mathcal{L}, k \in \mathcal{N}_R(\ell) \quad (7)$$

where $M_1$ and $M_2$ are big numbers. The decision tree regression y=h(x) can be represented as a mixed-integer bilinear model $$y = \sum_{\ell \in \mathcal{L}} e_\ell (w_\ell^T x + c_\ell)$$

s.t. Eqs. (6),(7)

$$e_\ell \in \{0,1\}, \forall \ell \in \mathcal{L}. \quad (8)$$

The process can further linearize the bilinear term $c_l(w_l^T x + c_l)$ as follows. Assume $y_l^L <= w_l^T x + c_l <= \_y_l^U$ for some constants $y_l^L$, $y_l^U$. This assumption is reasonable because x is usually bounded; for example, the training data are normalized to the 0-1 range, and $w_l$ and $c_l$ are fixed model parameters. Then the process has $y_l = c_l(w_l^T x + c_l)$ is equivalent to $$y_\ell^L e_\ell \leq y_\ell \leq y_\ell^U e_\ell$$

$$w_\ell^T x + c_\ell - y_\ell^U (1-e_\ell) \leq y_\ell \leq w_\ell^T x + c_\ell - y_\ell^L (1-e_\ell). \quad (9)$$

Hence a mixed-integer linear representation for the decision tree regression $y=h_t(x)$ is $$h_t(x) = \sum_{\ell \in \mathcal{L}} y_\ell$$

s.t. Eqs. (6),(7),(9)

$$e_\ell \in \{0,1\}, \forall \ell \in \mathcal{L}. \quad (10)$$

When these linear-based representations are plugged into the single-period and multi-period models, one gets MILP formulations, which can be efficiently solved to optimality by a MILP solver.

When the regression functions are nonlinear functions, the present disclosure proposes to compute the function values and gradients for the regressors. The single-period problem and the multi-period problem are solved by a gradient-based algorithm such as augmented Lagrangian algorithm or the alternating direction method of multipliers (ADMM) algorithm.

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method for optimizing operations of a physical plant, the method comprising:
   mapping a process flow diagram, of a plant process of the physical plant to a graph comprising nodes and edges, wherein the nodes represent processes, each associated with a set of control and environmental variable, and the edges represent flows between processes, and
   wherein the graph is a two-level fully connected feed-forward network of the physical plant with no skip layer assumption;
   receiving and processing historical data collected from sensors of the physical plant associated with each process, wherein the historical data includes real-time sensor measurements of flow rates, temperatures, and pressures of the physical plant;
   automatically learning a behavior for each node of the graph using a machine learning platform, wherein the behavior is based at least on the received historical data of the physical plant process;
   modeling one or more regression functions for each node using the machine learning platform to predict an output of each of the processes, wherein the one or more regression functions are modeled based on the learned behavior for each node; and
   sequentially adjusting controls of the physical plant by generating and transmitting control signals to actuators, including valves, and pumps, of the physical plant to effect changes in flow rates, pressures, and/or temperatures such that acceptable storage inventories are maintained in one or more predetermined time periods, based on the modeling.

2. The computer implemented method of claim 1, wherein inputs for each node include controlled variables and uncontrolled variables.

3. The computer implemented method of claim 1, further comprising encoding network topology by generating an adjacency matrix for the graph, the adjacency matrix identifying interconnected nodes.

4. The computer implemented method of claim 3, further comprising decoding the network topology using one or more matrices and positions of nodes and edges from the graph to plot a directed acyclic graph for input verification.

5. The computer implemented method of claim 3, further comprising generating an optimization model from the regression functions for each node and the adjacency matrix, the optimization model providing setpoints for each node for an optimization of one or more parameters.

6. The computer implemented method of claim 5, wherein a model generator outputs a continuous optimization model with a function value estimator and a gradient estimator.

7. The computer implemented method of claim 5, wherein a model generator outputs a mixed-integer linear program for modelling the one or more regression functions.

8. The computer implemented method of claim 5, further comprising providing different key performance indicators as input and producing options for setpoints to achieve the inputted key performance indicators.

9. The computer implemented method of claim 1, further comprising automatically determining whether an input of the regression function is correct.

10. The computer implemented method of claim 1, wherein the regression functions include piece-wise linear and non-linear types of regression models.

11. A computer implemented method for automatically generating an optimization model for a site-wide optimization of a physical plant, comprising:
   defining a graphical representation for a process flow diagram of the physical plant, wherein the graphical representation is a two-level fully connected feed-forward network with no skip layer assumption;

receiving and processing historical data collected from sensors of the physical plant associated with each process, wherein the historical data includes real-time sensor measurements of flow rates, temperatures, and pressures of the physical plant;

encoding a network topology of the graphical representation to generate an adjacency matrix for the graphical representation;

automatically generating a set of equations defining the network topology;

modeling one or more regression functions using a machine learning platform to predict an output of each process of the physical plant based on inputs received at each process;

generating an optimization model from the one or more regression functions for each node and the adjacency matrix, the optimization model providing setpoints for each process of the physical plant, wherein each node represents a process of the physical plant, each node associated with a set of control and environmental variable; and sequentially adjusting controls of the physical plant by generating and transmitting control signals to actuators, including valves, and pumps, of the physical plant to effect changes in flow rates, pressures, and/or temperatures such that acceptable storage inventories are maintained in one or more predetermined time periods, based on the modeling.

12. The computer implemented method of claim 11, further comprising decoding the network topology using matrices and positions of nodes and edges from the graphical representation to plot a directed acyclic graph for input verification.

13. The computer implemented method of claim 11, wherein the encoding of the network topology includes generating an adjacency matrix for the graph, the adjacency matrix identifying interconnected nodes.

14. The computer implemented method of claim 13, further comprising generating an optimization model from the regression functions for each node and the adjacency matrix.

15. The computer implemented method of claim 14, wherein a model generator outputs a continuous optimization model with a function value estimator and a gradient estimator.

16. The computer implemented method of claim 14, wherein a model generator outputs a mixed-integer linear program for modelling the one or more regression functions.

17. A non-transitory computer readable storage medium tangibly embodying a computer readable program code having computer readable instructions that, when executed, causes a computer device to carry out a method of improving computing efficiency of a computing device for automatically generating an optimization model for site-wide optimization of a physical plant, the method comprising:

defining a graphical representation comprising nodes and edges for a process flow diagram of the processes of the entire physical plant, wherein:

the nodes of the graphical representation represent processes of the physical plant, each associated with a set of control and environmental variable, and the edges of the graphical representation represent flows between the processes of the entire physical plant; and the graphical representation is a two-level fully connected feed-forward network with no skip layer assumption;

receiving and processing historical data collected from plant sensors associated with each process, wherein the historical data includes real-time sensor measurements of flow rates, temperatures, and pressures of the physical plant;

encoding network topology of the graphical representation by generating an adjacency matrix for the graph, the adjacency matrix identifying interconnected nodes;

automatically generating a set of equations defining the network topology;

modeling one or more regression functions using a machine learning platform to predict an output of each process of the processes of the entire physical plant based on inputs received at each process;

generating an optimization model from the one or more regression functions for each node and the adjacency matrix, the optimization model providing setpoints for each process of the entire physical plant; and sequentially adjusting controls of the physical plant by generating and transmitting control signals to actuators, including valves, and pumps, of the physical plant to effect changes in flow rates, pressures, and/or temperatures such that acceptable storage inventories are maintained in one or more predetermined time periods, based on the modeling.

18. The non-transitory computer readable storage medium of claim 17, wherein the execution of the code by the processor further configures the computing device to perform an act comprising decoding the network topology using matrices and positions of nodes and edges from the graph to plot a directed acyclic graph for input verification.

19. The non-transitory computer readable storage medium of claim 17, wherein a model generator outputs a continuous optimization model with a function value estimator and a gradient estimator.

20. The non-transitory computer readable storage medium of claim 18, wherein the model generator outputs a mixed-integer linear program for modelling the one or more regression functions.

21. The computer implemented method of claim 1, wherein the physical plant is an oil sands processing plant.

22. The computer implemented method of claim 1, wherein the sequential adjusting of the controls is of at least one of a flow rate temperature, or pressure of the physical plant.

* * * * *